United States Patent
Bach et al.

(10) Patent No.: US 8,255,138 B2
(45) Date of Patent: Aug. 28, 2012

(54) METHOD FOR STARTING A MOTOR VEHICLE ON AN INCLINED ROUTE

(75) Inventors: Thomas Bach, Wolken (DE); Michael Bleser, Plaidt (DE); Harald Thelen, Oberfell (DE); Elmar Hoffmann, Meinborn (DE); Bernd Schmitt, Neuwied (DE)

(73) Assignee: Lucas Automotive GmbH, Koblenz (DE)

( * ) Notice: Subject to any disclaimer, the term of this patent is extended or adjusted under 35 U.S.C. 154(b) by 359 days.

(21) Appl. No.: 12/601,362

(22) PCT Filed: May 16, 2008

(86) PCT No.: PCT/EP2008/003974
§ 371 (c)(1),
(2), (4) Date: Apr. 13, 2010

(87) PCT Pub. No.: WO2008/141782
PCT Pub. Date: Nov. 27, 2008

(65) Prior Publication Data
US 2010/0228458 A1    Sep. 9, 2010

(30) Foreign Application Priority Data
May 23, 2007   (DE) .......................... 10 2007 023 929

(51) Int. Cl.
B60T 7/12   (2006.01)
(52) U.S. Cl. .......................................... 701/78; 477/194

(58) Field of Classification Search .................... 701/78; 303/192; 477/194
See application file for complete search history.

(56) References Cited

U.S. PATENT DOCUMENTS

| | | | |
|---|---|---|---|
| 6,086,515 | A | 7/2000 | Buschmann et al. |
| 7,375,438 | B2 | 5/2008 | Schmidt |
| 2007/0164608 | A1 | 7/2007 | Streit et al. |
| 2008/0294319 | A1 | 11/2008 | Baijens et al. |

FOREIGN PATENT DOCUMENTS

| | | |
|---|---|---|
| DE | 3621076 C2 | 3/1992 |
| DE | 19525552 A1 | 1/1997 |
| DE | 19912878 A1 | 4/2000 |
| DE | 10306362 A1 | 5/2004 |
| DE | 10301824 A1 | 7/2004 |
| DE | 10322125 A1 | 12/2004 |
| DE | 102006020164 A1 | 11/2006 |
| DE | 102005041071 A1 | 3/2007 |
| DE | 10249463 B4 | 4/2007 |
| DE | 102005052160 A1 | 5/2007 |
| EP | 1410940 A1 | 4/2004 |
| EP | 1777133 A1 * | 4/2007 |
| WO | 0114186 A1 | 3/2001 |
| WO | 2005090134 A1 | 9/2005 |

\* cited by examiner

*Primary Examiner* — Gerald McClain
(74) *Attorney, Agent, or Firm* — MacMillan, Sobanski & Todd, LLC

(57) ABSTRACT

A method for starting a motor vehicle, which is held at a standstill on an inclined route by a brake force which is maintained independently of the driver, after a predetermined holding time has elapsed gradually reduces the brake force which is generated independently of the driver, to put the motor vehicle into motion, and then controls the movement of the motor vehicle, corresponding to a preset course.

14 Claims, 3 Drawing Sheets

METHOD FOR STARTING A MOTOR VEHICLE ON AN INCLINED ROUTE

CROSS-REFERENCE TO RELATED APPLICATIONS

This application is a national stage of International Application No. PCT/EP2008/003974 filed May 16, 2008, the disclosures of which are incorporated herein by reference, and which claimed priority to German Patent Application No. 10 2007 023 929.9 filed May 23, 2007, the disclosures of which are incorporated herein by reference.

BACKGROUND OF THE INVENTION

The invention concerns a method for starting a motor vehicle on an inclined route. In particular, the invention concerns driver-independent support for starting a motor vehicle on an inclined route.

Systems which support the processes of stopping and starting a motor vehicle on a downhill or uphill gradient are known. Some of these systems generate a brake force, independently of the driver, by means of a brake system of the motor vehicle, when the motor vehicle comes to a standstill on an inclined route, or maintain a brake force generated by the brake system, independently of the driver, after the motor vehicle reaches a standstill. Whether the motor vehicle reaches the standstill because of brake actuation by the driver, brake actuation independently of the driver or the motor vehicle coasting is insignificant here.

Such a system is known, for instance, by the name "Hill Assist". This system is constructed so that if, after the standstill is reached, the driver does not actuate the brake system, it maintains the brake force for a specified holding time (typically about 0.6-2 seconds), to make it easier for the driver to start on the inclined route. After the predetermined holding time expires, if no successful starting occurs, the brake force of the motor vehicle is continuously or abruptly withdrawn. Consequently, the motor vehicle begins to roll downhill in an uncontrolled manner, at a more or less quickly increasing speed.

The introduction of such an uncontrolled driving state may not, or not until later, be noticed by the driver of the motor vehicle, so that the motor vehicle can cause damage during its uncontrolled downhill movement. In particular, abrupt release of the brake actuation, independently of the driver, can result in the driver being taken by surprise by the changed driving situation and losing control of the motor vehicle. Accordingly, it would be desirable to avoid an uncontrolled driving state of a motor vehicle when a driver-independent hill holding function ends.

BRIEF SUMMARY OF THE INVENTION

The present invention is based on an object of providing a method which avoids an uncontrolled driving state of a motor vehicle when a driver-independent hill holding function ends.

According to a first aspect, a method for starting a motor vehicle which is held at a standstill on an inclined route by a brake force which is maintained independently of the driver comprises the following steps: a) holding the motor vehicle at a standstill, independently of the driver, for a predetermined holding time; b) gradually reducing the brake force which is maintained independently of the driver, to put the motor vehicle into motion; and c) driver-independently controlling the movement of the motor vehicle, corresponding to a preset course.

The brake force which holds the motor vehicle at a standstill on the inclined route can be generated by the driver or independently of the driver. For instance, a driver of the motor vehicle can have generated a brake force before or after the motor vehicle reaches a standstill. Alternatively, driver-independent brake force generation may have brought the motor vehicle to a standstill and/or hold it at a standstill. In a further embodiment, driver-independent brake force generation can be used only after the motor vehicle has reached a standstill.

Here and below, the control of a movement of the motor vehicle refers to the course of the movement of the motor vehicle over time in the direction of movement. The route can be inclined in or against the direction of movement of the motor vehicle. The direction of movement of the motor vehicle on the inclined route is usually downhill. The motor vehicle can be oriented with its front uphill or downhill, and the downhill movement can be forward or backward.

In parallel with step a), it is possible to detect whether an abortion condition exists, and in the case that an abortion condition exists to continue with step b) after executing step a). In this way, if an event which endangers safety is present, for instance, and after the removal of the brake force which was maintained independently of the driver, the movement of the motor vehicle can subsequently be controlled independently of the driver, in a prompt and controlled manner.

In particular, the abortion condition can include a system fault, e.g. if a movement of the motor vehicle is detected although the wheels are not moving. The abortion condition can also include detecting an indication of an attempt by the driver to leave the vehicle. If the driver leaves the vehicle before the predetermined holding time has expired, the operating state of the vehicle can be indicated to him or her, gently but directly, by the controlled rolling forward. A driver who has already partly left the motor vehicle when it begins to roll can thus more easily take his or her position at the controls of the motor vehicle, and take control.

The indication of an attempt by the driver to leave the vehicle can comprise at least one of the following events: switching off a drive motor of the motor vehicle, removing an ignition key from an ignition lock of the motor vehicle, opening a driver's door of the motor vehicle, releasing a seat belt on a driver's seat of the motor vehicle, switching off multiple electrical loads of the motor vehicle. In general, determination of an indication of an attempt by the driver to leave the vehicle can also comprise a combination of multiple detected events. Beyond the stated conditions, further events and states which are detected in the region of the motor vehicle can be included in the determination of the indication of an attempt by the driver to leave the vehicle. For instance, an attempt by the driver to leave the vehicle can also be determined by means of a seat occupancy or weight contact on the driver's seat. In a further embodiment, a contactless monitoring system, e.g. an ultrasound, light barrier or camera system, can be used to detect indications of an attempt by the driver to leave the vehicle. Such a contactless system can also, for instance, be implemented in the form of a microsleep detection system. Processing the direct measured values is possible, as is linking pre-processed measured values with each other or with other detected conditions.

The preset movement course of the motor vehicle can include a speed course. The speed course can be preset statically and/or be adjustable during the execution of the method. For instance, the motor vehicle speed to be reached can be adapted to the inclination of the route. Also, for instance, in the case of a steep inclination of the route, a lower vehicle speed can be preset than in the case of an only shallowly inclined route. When the motor vehicle passes between sections of the route with different inclinations, the preset speed can be adjusted accordingly.

The speed course can include a gradual transition from standstill to a preset speed. A course which is preset in multiple segments is also possible. The gradual transition of the speed of the motor vehicle can be passed through within a preset time span. For instance, if because of external circumstances the motor vehicle does not reach a preset speed in a first course section, in a later course section a more rapid increase of speed can be preset, to reach the preset speed by the end of the time span.

Controlling the movement of the motor vehicle can include controlling or regulating the speed of the motor vehicle. To regulate the speed of the motor vehicle, it can be necessary to capture and evaluate additional signals of the motor vehicle. In particular, it can be necessary to determine a speed of the motor vehicle. In this case, the signals of wheel speed sensors can be accessed. Alternatively, a speed signal which is provided by another system of the motor vehicle can be evaluated.

The speed of the motor vehicle can be controlled or regulated by a Hill Descent Control (HDC) system. Such systems, which are known per se, control or regulate downhill movement of a motor vehicle by driver-independently modulated activation of the brake system. An HDC system can also influence the drive system of the motor vehicle. In general, instead of an HDC system, a different system which controls or regulates the speed of the motor vehicle can be used. This includes, in particular, systems such as speed regulation systems which (only) influence the drive system of the motor vehicle.

Control of the movement of the motor vehicle can also include control of a brake force which is associated with a brake system of the motor vehicle. Such a procedure is indicated, in particular, in the case of hydraulically and/or pneumatically and/or electromechanically actuated brake systems. As an electromechanically actuated brake system, for instance an EMB (electromechanical brake) or an EPB (electronic parking brake) come into consideration.

The motor vehicle can have a pressure-controlled brake system, and the brake force can be maintained by "locking in" a brake pressure in a brake actuator, independently of the driver.

Control of the movement of the motor vehicle can include limiting an acceleration of the motor vehicle. Acceleration of the motor vehicle can be determined by an acceleration sensor, or by processing a speed signal, e.g. by a mathematical derivation of the speed signal according to time. In this context, acceleration of the motor vehicle means the change of the speed of movement of the motor vehicle relative to the route.

A brake force which the driver of the motor vehicle generates can always have precedence over reduction of the brake force which is maintained independently of the driver. For instance, if the driver of the motor vehicle actuates the brake system during step a), in this case the motor vehicle is held at a standstill by the brake force which the driver generates; the movement of the motor vehicle is then not regulated independently of the driver. The driver of the motor vehicle can also brake the motor vehicle or put it at a standstill by actuating the brake during one of steps b) and c). The driver is thus enabled to take control of the movement of the motor vehicle at any time.

Driver-controlled starting of the motor vehicle can cause a reduction of the brake force which is maintained independently of the driver, and end the method. In one version, driver-controlled starting of the motor vehicle is recognised if a propulsive power generated by the drive system of the motor vehicle is greater than a brake force which is required to hold the motor vehicle on the inclined route. This avoids the motor vehicle beginning to roll downhill before the movement of the motor vehicle is sufficiently controlled by the drive motor. In particular, in this way an uncontrolled driving state is avoided, even if the drive motor stalls when started.

A computer program product can comprise program code means for executing the given method when the computer program product runs on a processing unit. Such a processing unit can be a control unit in the motor vehicle, for instance. The computer program product can be stored on a computer-readable data medium. Such a memory can include, for instance, a magnetisable medium such as a hard disk or floppy disk, or a volatile or non-volatile memory component such as a PROM or flash memory.

A device for starting a motor vehicle which is held at a standstill on an inclined route by a brake force which is maintained independently of the driver comprises a device for holding the motor vehicle at a standstill, independently of the driver, for a predetermined holding time, a device for gradual reduction of the brake force which is maintained independently of the driver, to put the motor vehicle into motion, and a device for controlling the movement of the motor vehicle, independently of the driver, corresponding to a preset course. Such a device can be implemented in the form of a control or regulation system on board a motor vehicle, for instance. It is possible to implement the device using elements which are used by another system installed in the motor vehicle, e.g. an ABS or ESP system. Such components can be valves, pumps, sensors, processing devices, transmission devices, motors, pressure accumulators, operating controls and interfaces.

Other advantages of this invention will become apparent to those skilled in the are from the following detailed description of the preferred embodiments, when read in light of the accompanying drawings.

DETAILED DESCRIPTION OF THE INVENTION

Figure 1:
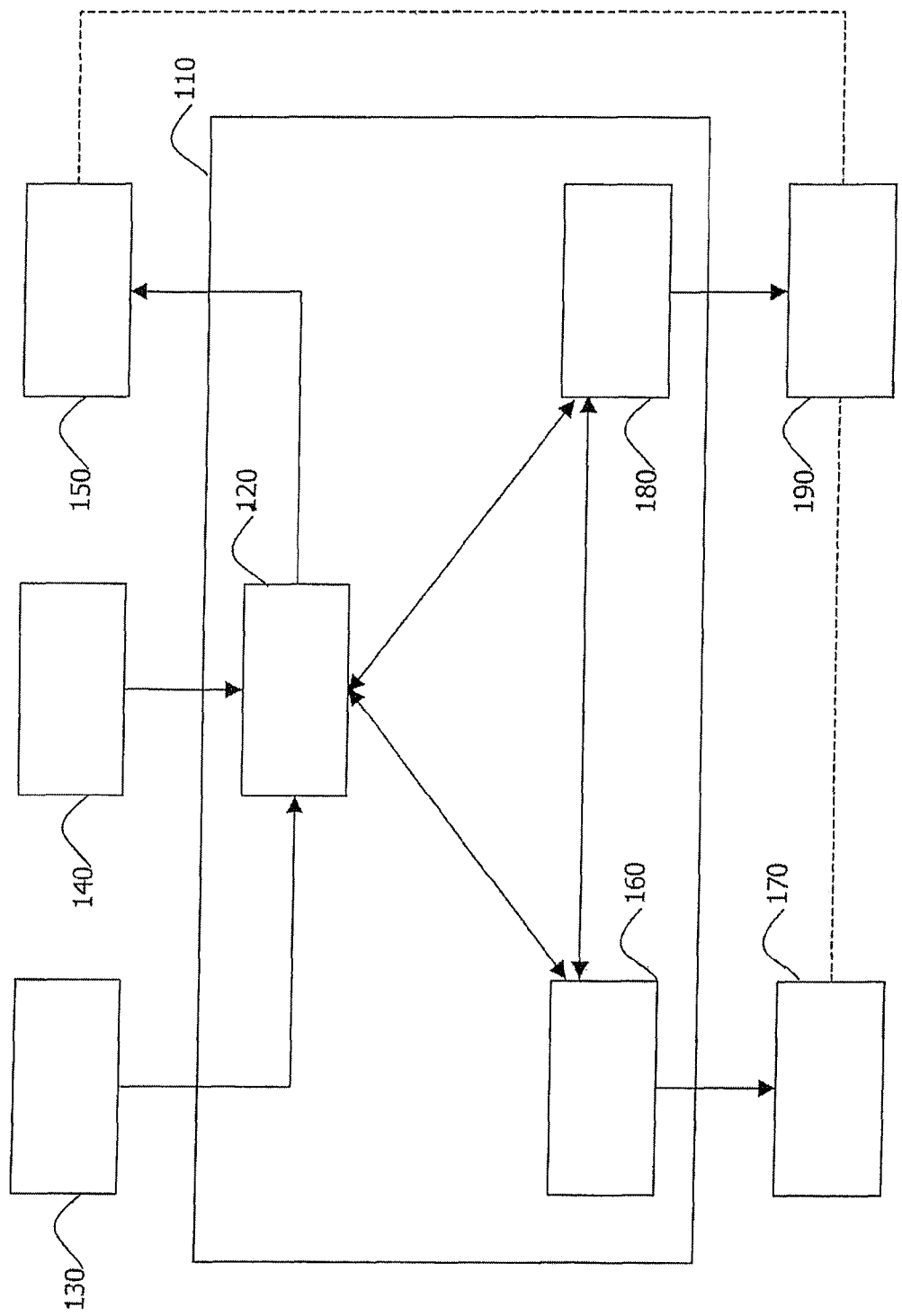
FIG. 1 shows an embodiment of a device for starting a motor vehicle on an inclined route according to this invention.

FIG. 1 shows an embodiment of a device 110 for starting a motor vehicle on an inclined route. The device 110 includes a device 120 for holding the motor vehicle at a standstill, independently of the driver, for a predetermined holding time.

The device 120 can be connected to a device 130 which determines whether the motor vehicle is at a standstill. For instance, the device 130 can process the signals from one or more wheel speed sensors. For this purpose, other or additional signals can be processed. The device 130 can also process preprocessed signals of another system which is installed in the motor vehicle. For instance, an ABS or ESP system can provide a speed signal, and from its falling to zero or a value near zero, the device 130 deduces that the motor vehicle is at a standstill.

The device 120 can also be connected to a device 140, which determines whether a preset holding time is reached. For this purpose, the device 140 can have a timer, which makes a time signal available. Such a timer can be implemented in the form of a clock generator which is included in the device 140; alternatively, an external clock signal can be fed to the device 140. The predetermined holding time can be stored in the device 140. For this purpose, the device 140 can include a holding time memory, for instance. The holding time can be stored in the memory in permanent or changeable form. Alternatively, the predetermined holding time can be stored in the device 120, and the device 120 can have a memory for the holding time.

In one embodiment, a driver of the motor vehicle can make a selection for the predetermined holding time, freely or within preset limits. In a further embodiment, changing the predetermined holding time stored in the memory is provided only when the motor vehicle is serviced. In this case, an external device for entering and/or changing the predetermined holding time can be necessary.

The device 140 can be connected to the device 130 (not shown in the drawings), to make the start of a time measurement depend on the movement state of the motor vehicle. Corresponding information can also be passed on via the device 120. A movement signal of the motor vehicle, provided by the device 130, can be used by the device 140 to abort an ongoing measurement. In this way, the device 140 determines only a continuous holding time of the motor vehicle.

All devices of the device 110 can communicate with each other, as indicated by the connections between the devices 120, 160 and 180.

The device 120 can also be connected to a device 150 for holding the motor vehicle at a standstill. The device 150 can influence a brake system of the motor vehicle. If a hydraulically or pneumatically actuated brake system is used, for instance the driver-independent maintenance of the brake force, which holds the motor vehicle at a standstill on the inclined route, can be implemented by a controlled valve "locking in" a brake pressure which is built up in the wheel brakes. This can concern an increased pressure relative to a driving state of the motor vehicle (e.g. in the case of a hydraulic brake system), or a reduced pressure (e.g. in the case of a pneumatic brake system). In a further embodiment, the device 150 can raise a brake force independently by influencing further elements of the brake system of the motor vehicle. Such elements can include valves, pressure accumulators, pumps, boilers and other elements.

The device 110 also includes a device 160 for gradual (e.g. ramp-like) reduction of the brake force which is maintained independently of the driver, to put the motor vehicle into motion. For this purpose, the device 160 is connected to the device 170, which influences the brake system of the motor vehicle. The device 160 is preferably designed to carry out a brake force reduction in an analogue, i.e. continuously variable, manner. Additionally, the device 160 can process a standstill signal from the device 130 (connection not shown). In this way, the device 160 can determine an interrelationship between an initiated brake force reduction and a start of movement of the motor vehicle.

Additionally, the device 160 can be connected to devices which provide information about a movement course of the motor vehicle (not shown). For instance, the device 160 can process a speed signal, to withdraw a brake force which is maintained independently of the driver in such a way that the start of the movement course of the motor vehicle is gentle and even. Such a speed signal can be provided by the device 130.

The device 160 can also be connected to a device which determines an acceleration of the motor vehicle. For instance, such a device can determine it on the basis of a movement or speed signal of the motor vehicle. Taking account of the acceleration signal, the device 160 can control the brake force reduction in such a way that preset conditions such as a preset maximum acceleration of the motor vehicle are maintained.

If the driver-independent holding of the motor vehicle at a standstill is effected by a pressure being "locked into" an actuator, the device 170 for reducing the brake force which is maintained independently of the driver can effect an opening of this valve, in such a way that the pressure which is locked into the wheel brakes or brake actuators is gradually reduced. The devices 160 and 170 are adapted to each other in such a way that it is possible to control an apportioned reduction of the brake force by the device 160, via the device 170. To increase the precision of such apportionment, the device 160 can additionally be connected to a device which determines a brake force, which generates a braking effect, of the brake system of the motor vehicle.

Finally, the device 110 includes a device 180 for controlling the movement of the motor vehicle independently of the driver, corresponding to a preset course. For this purpose, the device 180 is connected to a device 190, which influences a brake system of the motor vehicle. In a further embodiment, the device 190 can also include means for accelerating the motor vehicle in the direction of travel, independently of the route inclination. Such means can include a drive motor of the motor vehicle and/or at least one of its power transmission systems.

The device 180 can control or regulate the movement of the motor vehicle. The device 180 can additionally be connected to devices which determine the speed and/or acceleration of the motor vehicle. In a further embodiment, the device 180 can obtain values, which describe a movement of the motor vehicle, from one of the units 120, 130, 140 and 160. In this way, regulation of the movement of the motor vehicle is made possible. The device 180 can also be connected to a device for determining the inclination of the route (not shown).

The preset movement course can be stored in the device 190. This movement course can be constant or depend on parameters. Such parameters can be the inclination of the route, the speed and/or acceleration of the motor vehicle and the state of the driver's controls. Alternatively, the preset movement course can be determined and/or changed on the basis of parameters at the execution time of the method. A device for determining and/or adjusting the preset movement course is not shown in FIG. 1.

As indicated by a dashed line, the devices 150, 170 and 190 can include each other fully or partly. In one embodiment, only one combined device is used, and exerts all influence of the device 110 on the brake system of the motor vehicle.

Figure 2:
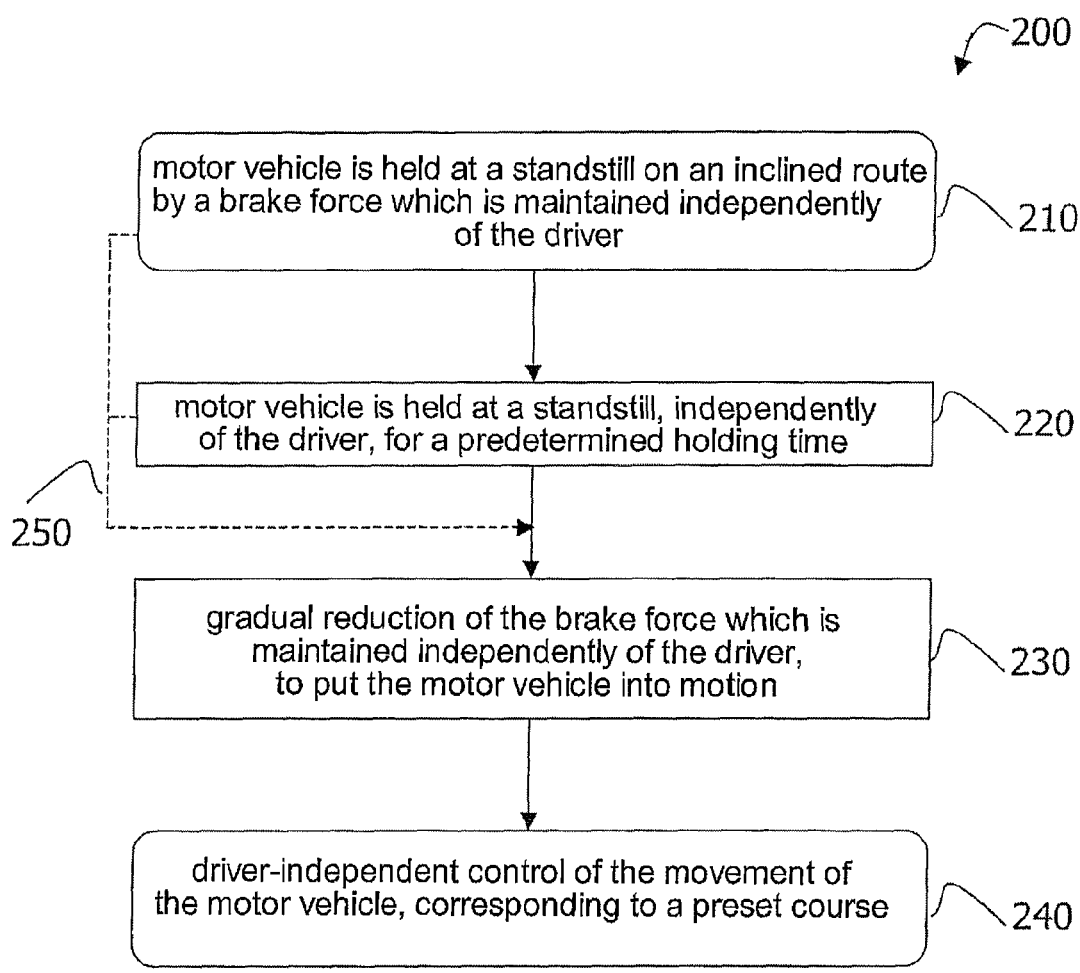
FIG. 2 shows a flowchart of a method for starting a motor vehicle on an inclined route according to this invention.

FIG. 2 shows an exemplary flowchart 200 of a method for starting a motor vehicle on an inclined route. This method can be carried out by means of the device according to FIG. 1, or a differently configured device.

In the initial state 210, the motor vehicle is held at a standstill on the inclined route by a brake force which is maintained independently of the driver. The brake force which holds the motor vehicle at a standstill may have been generated by the driver or independently of the driver.

In the subsequent step 220, the motor vehicle is held at a standstill, independently of the driver, for a predetermined holding time, e.g. by a Hill Assist system. In this way, the holding time which is achieved, and during which the motor vehicle is at a standstill, is not cumulative but continuous.

In step 230, the brake force which is maintained independently of the driver is gradually reduced, to put the motor vehicle into motion. The brake force is reduced evenly and slowly enough so that an unprepared driver of the motor vehicle is not taken by surprise by the occurrence of a movement of the motor vehicle, but at the same time quickly enough so that downhill rolling of the motor vehicle, which may be intended, is not delayed unnecessarily. The course of the movement of the motor vehicle preferably takes place so that the transition to the control of the movement of the motor vehicle, carried out in the subsequent step 240, takes place according to a preset course, seamlessly and unnoticeably for the driver of the motor vehicle.

Speed regulation, which for instance in step 240 makes maintenance of a predetermined speed possible when a motor vehicle is moving downhill, is known in the prior art. Such speed regulation is disclosed in DE 10 2005 041 071, for instance. Depending on a current speed of the motor vehicle, a brake system of the motor vehicle is actuated independently of the driver in such a way that the vehicle speed approaches a predetermined speed. Such systems are known by the name Hill Descent Control (HDC). For instance, control of the movement of the motor vehicle corresponding to a preset course can be implemented by forced activation of an HDC function with a suitable setpoint speed. In a further embodiment, every known type of movement regulation for motor vehicles can be used, e.g. those which influence a drive motor of the motor vehicle ("CruiseControl").

In a preferred embodiment, the preset movement course of the motor vehicle includes an acceleration phase and a phase of constant speed. In both the acceleration phase and the phase of constant speed, the preset movement can depend on a gradient of the route. The transition between steps 230 and 240 is designed so that as gentle and even as possible a transition between the acceleration phase and the phase of constant speed is achieved. In particular, preferably the speed of the motor vehicle is influenced so that "overshooting" the speed to be achieved is avoided. Such overshooting, which may be multiple, is also called "aperiodic regulation".

The dashed line 250 from steps 210 and 220 to step 230 indicates that if an abortion condition is present, it is possible to continue with step 230 even if the predetermined holding time is not reached. Such an abortion condition can include system fault or an attempt by the driver to leave the vehicle. The system fault can concern any parts of the motor vehicle. Indications of an attempt by the driver to leave the vehicle can include signals which signal, for instance, switching off the drive motor, removing the ignition key from the ignition lock of the motor vehicle, opening the driver's door of the motor vehicle, releasing a seat belt on a driver's seat of the motor vehicle, switching off multiple electrical loads of the motor vehicle, and further events and/or states of the motor vehicle. Ideally, the signal of a seat contact or another dedicated presence detector, which indicates whether a person is on the driver's seat, can be processed. In further embodiments, any kind of device or heuristic of the prior art can be used to determine an attempt by the driver to leave the vehicle.

Figure 3:
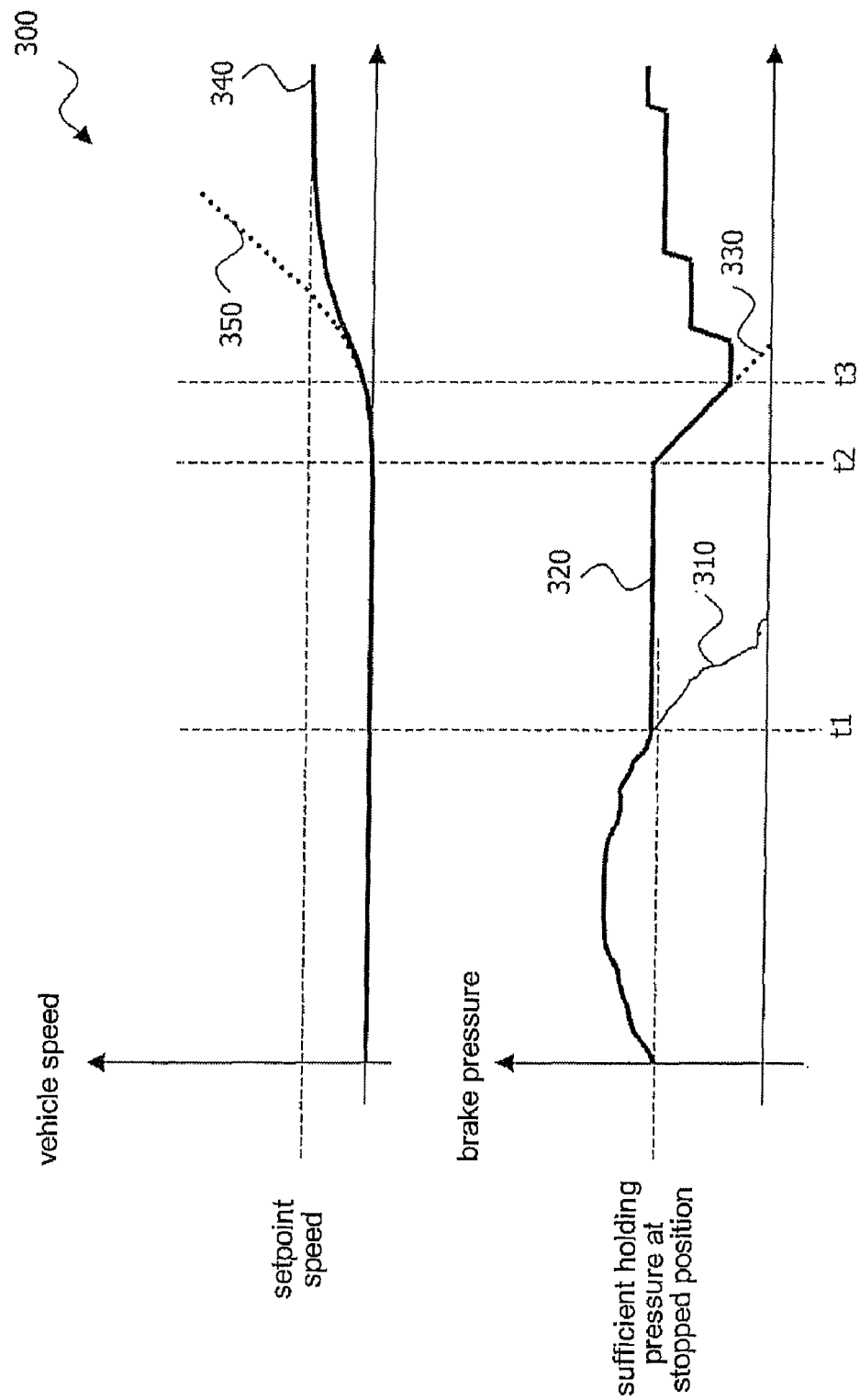
FIG. 3 shows exemplary courses over time of vehicle speeds and brake pressures in motor vehicles, with and without use of this invention.

FIG. 3 shows a diagram 300 of courses of driving speeds and brake pressures over time. In the horizontal direction, in both the top and the bottom parts of the diagram 300, a time course is indicated to the right. The vertical axis for the top part of the diagram denotes a vehicle speed. In the bottom part of the diagram 300, the vertical axis denotes a brake pressure of a brake system of the motor vehicle. In the embodiment shown here, the brake pressure of a brake system of the motor vehicle is manipulated to control the movement of the motor vehicle according to a preset course.

The curve 310 in the bottom part of the diagram denotes a brake pressure course which the driver causes or requests (e.g. by foot force). To the left of instant t1, the driver's brake pressure 310 coincides with the thicker line of a total brake pressure 320. The horizontal dashed line in the bottom part of the diagram signifies the holding pressure which is sufficient to hold the motor vehicle, which is at a standstill, at a standstill on the inclined route. Until instant t1, the driver's brake pressure 310 runs above this sufficient holding pressure. At instant t1, the driver's brake pressure falls below the sufficient brake pressure. The brake pressure 320, which is shown in the bottom part of the diagram by a thick continuous line, is the total brake pressure which acts on the motor vehicle. Until instant t1, this brake pressure 320 follows the driver's brake pressure 310. However, the brake pressure 320 at instant t1 does not fall below the sufficient holding pressure to hold the motor vehicle at a standstill, but remains, (from shortly before instant t1) until instant t2, above the sufficient holding pressure, since at instant t1 suitable valves of the brake system are closed, and the brake pressure is thus "locked in".

The gap between instants t1 and t2 corresponds to a predetermined holding time of the motor vehicle. Such a holding time can typically be approx. 0.6 to 2 seconds. According to one embodiment, instant t2 can also identify the occurrence of an abortion condition. Such an abortion condition can include a system fault or an attempt by the driver to leave the vehicle.

From instant t2 to instant t3, the brake pressure 320 is gradually reduced in a ramp-like manner, independently of the driver.

The brake pressure course 330, shown by a dotted line, corresponds to a known Hill Assist system of the prior art. Until instant t3, the brake pressure course 330 runs correspondingly to the brake pressure course 320. However, the linear reduction of the brake pressure 330 continues after instant t3, until the brake pressure 330 has sunk to zero. In another known embodiment of the prior art, at instant t2 the brake pressure is very quickly (abruptly) reduced to zero (not shown).

In the exemplary embodiment, the brake pressure 320 at instant t3 is first kept constant, and then raised by a control or regulation algorithm, in several steps of decreasing size. The effects of the brake pressures 320 and 330 on corresponding speed courses of the motor vehicle are now described with reference to the top part of the diagram 300.

In the top part of the diagram 300, the curve 340 denotes the course of the speed of the motor vehicle, corresponding to the brake pressure 320. Until instant t2, at which the brake pressure 320 is less than the sufficient holding pressure to hold the motor vehicle on the inclined route, the speed of the motor vehicle is zero. While the brake pressure 320 is reduced linearly between instants t2 and t3, the speed of the motor vehicle increases. After instant t3, the speed course 340, because of the control and regulation interventions, adapts itself asymptotically to a preset setpoint speed, which is shown by a horizontal dashed line. It can easily be seen that the speed course 340 reaches the setpoint speed some time after instant t3.

The speed course of a motor vehicle of the prior art, shown by the dotted line 350, corresponds to the brake pressure 330 in the bottom part of the diagram 300. Until instant t2, the speed course 350 corresponds to the speed course 340. The increase of the speed course 350 lasts after instant t3, in contrast to that of the speed course 340. It can be seen that the motor vehicle has been transferred to an uncontrolled driving state of unlimited speed.

Until instant t3, the course of the brake pressure 330 of a known Hill Assist system corresponds to the brake pressure 320 of this method. After instant t3, the course of the brake pressure 320 is comparable to that of a known Hill Descent Control system. Thus by transferring the brake pressure from a Hill Assist system to a Hill Descent Control system, driving safety is increased.

The growth of the speed course of the motor vehicle depends on the inclination of the route on which the motor vehicle is, and the speed at which the brake pressure is reduced. In particular, rapid withdrawal of the brake pressure can result in an uncontrolled driving state of the motor vehicle. In contrast, when the presented technique is used, after the expiry of a predetermined holding time, driver-independent movement of the motor vehicle is caused quickly, but not startlingly, and is rapidly and gently continued by a control or regulation device. Optionally, reduction of the brake force which is maintained independently of the driver, and handing over the brake pressure to a speed regulation device, can also be triggered by the occurrence of a break condition.

This invention increases the comfort of the driver, who is supported when starting on an inclined route. At the same time, a vehicle behaviour which the driver can always anticipate and/or understand is caused. Situations in which the driver cannot rely on an expected effect of his or her actions, or in which the vehicle reacts in a way which cannot be immediately understood, are avoided. Such driver actions also include "passive actions" such as intentional failure by the driver to actuate the brake during a holding time. Additionally, an abortion condition of the method can result in the vehicle putting itself into motion immediately. For instance, if the abortion condition is linked to indications according to which the driver is leaving the motor vehicle, the driver can be informed gently, but immediately, about the consequence of his or her action, during a leaving process. This very direct kind of driver warning helps to increase safety in the operation of the motor vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method for starting a motor vehicle which is held at a standstill on an inclined route by a brake force which is maintained independently of the driver, comprising the following steps:
   a) holding the motor vehicle at a standstill using a brake, independently of the driver, for a predetermined holding time;
   b) gradually reducing the brake force which is maintained independently of the driver, to put the motor vehicle into motion; and
   c) controlling the movement of the motor vehicle independently of the driver and corresponding to a preset course,
   wherein during step a), when the existence of an abortion condition is detected then step b) is continued with immediately, wherein the abortion condition includes detecting an indication of an attempt by the driver to leave the vehicle, and wherein the indication of an attempt by the driver to leave the vehicle includes at least one of:
      switching off a drive motor of the motor vehicle;
      removing an ignition key from an ignition lock of the motor vehicle;
      opening a driver's door of the motor vehicle;
      releasing a seat belt on a driver's seat of the motor vehicle; and
      switching off multiple electrical loads of the motor vehicle.

2. The method according to claim 1, wherein the abortion condition also includes a system fault.

3. The method according to claim 1, wherein a driver-controlled starting of the motor vehicle causes a reduction of the brake force which is maintained independently of the driver, and ends the method.

4. The method according to claim 1, wherein the preset movement course includes a speed course.

5. The method according to claim 4, wherein the speed course includes a gradual transition from standstill to a preset speed.

6. The method according to claim 1, wherein controlling the movement of the motor vehicle includes one of controlling and regulating the speed of the motor vehicle.

7. The method according to claim 6, wherein the speed of the motor vehicle is one of controlled and regulated by a Hill Descent Control (HDC) system.

8. The method according to claim 1, wherein control of the movement of the motor vehicle includes control of a brake force which is associated with a brake system of the motor vehicle.

9. The method according to claim 8, wherein the motor vehicle has a pressure-controlled brake system, and that the brake force is maintained by locking in a brake pressure in a brake actuator, independently of the driver.

10. The method according to claim 8, wherein control of the movement of the motor vehicle includes limiting an acceleration of the motor vehicle.

11. The method according to claim 8, wherein a brake force which the driver of the motor vehicle generates always has precedence over reduction of the brake force which is maintained independently of the driver.

12. The method according to claim 1 further including a step of providing a processing unit and a computer program product with program code for executing the method when the computer program product code runs on the processing unit.

13. The method according to claim 12, wherein the computer program product is stored on a computer-readable data medium.

14. A system for starting a motor vehicle which is held at a standstill on an inclined route by a brake force which is maintained independently of the driver, including:
   a control unit that is operative to hold the motor vehicle at a standstill using a brake, independently of the driver, for a predetermined holding time;
   a control valve that is operable to gradually reduce the brake force which is maintained independently of the driver, to put the motor vehicle into motion; and
   a device that is operable to provide driver-independent control of the movement of the motor vehicle, corresponding to a preset course,
   wherein the system is operable upon detection of an abortion condition to immediately drive the control valve for gradual reduction of the brake force which is maintained independently of the driver,
   wherein the abortion condition includes detecting an indication of an attempt by the driver to leave the vehicle, and
   wherein the indication of an attempt by the driver to leave the vehicle includes at least one of:
      switching off a drive motor of the motor vehicle;
      removing an ignition key from an ignition lock of the motor vehicle;
      opening a driver's door of the motor vehicle;
      releasing a seat belt on a driver's seat of the motor vehicle; and
      switching off multiple electrical loads of the motor vehicle.

* * * * *